(12) United States Patent
Coates

(10) Patent No.: X425
(45) Date of Patent: Feb. 14, 1803

(54) CUTTING APPLES & PARING/APPLE PARER

(76) Inventor: Moses Coates

United States Patent Patent No.: X425

Moses Coates, of Pennsylvania.

Letters Patent,— Feb.^y 14^th 1803.

The schedule referred to in these Letters Patent and making part of the same, containing a description
in the words of the said Moses Coates himself of his improvement. Being a machine for paring Apples
or other fruit.

Specification:
This machine consists of a small board or plank for its basis, and
two posts standing erect in which turns a small spindle with a fork at one end to stick the apple or
other fruit or root on, and a crank at the other end to turn it by: two other studs similar to the
former placed to receive and support an axletree which passes through a sweep. from this sweep
extends two springs to the knife which is stocked with wood in such manner as to gauge the
thickness of the paring. Stick the apple, fruit, or root on the fork, turn the crank with the right hand,
and with the left move the sweep gradually half round. thus the apple, &c, is completely pared.
The part for cutting fruit and coring consists of a tube fixed in a lever, with wings extending from
the verge of the tube. the cores are forced up the tube and conveyed into a vessel placed to receive
them by means of ledges on the upper surface of the lever, the cut apples fall into a vessel
underneath.

Witnesses,
Asa Walton,
Caleb Coates.

Moses Coates.

(Recorded anew, Sep. 22, 1853.)